US012294874B2

United States Patent
Chenumolu et al.

(10) Patent No.: US 12,294,874 B2
(45) Date of Patent: May 6, 2025

(54) LINK FAILURE DETECTION BETWEEN DISTRIBUTED UNIT (DU) AND CENTRAL UNIT CONTROL PLANE (CU-CP)

(71) Applicant: DISH Wireless L.L.C., Englewood, CO (US)

(72) Inventors: Siddhartha Chenumolu, Englewood, CO (US); Ash Khamas, Englewood, CO (US); Dhaval Mehta, Englewood, CO (US); Gurpreet Sohi, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 226 days.

(21) Appl. No.: 17/853,241

(22) Filed: Jun. 29, 2022

(65) Prior Publication Data
US 2023/0276269 A1 Aug. 31, 2023

Related U.S. Application Data

(60) Provisional application No. 63/315,036, filed on Feb. 28, 2022.

(51) Int. Cl.
*H04J 3/14* (2006.01)
*H04L 41/0654* (2022.01)
(Continued)

(52) U.S. Cl.
CPC ......... *H04W 24/04* (2013.01); *H04L 41/0654* (2013.01); *H04L 45/22* (2013.01);
(Continued)

(58) Field of Classification Search
CPC ... H04W 24/04; H04W 36/14; H04W 36/305; H04W 76/19; H04W 76/25; H04W 76/27;
(Continued)

(56) References Cited

U.S. PATENT DOCUMENTS

2020/0077310 A1   3/2020  Cheng
2020/0106663 A1*  4/2020  Yoo .................... H04L 41/0668
(Continued)

FOREIGN PATENT DOCUMENTS

IN    20111029369        6/2021
WO    2021/161891 A1     8/2021
(Continued)

OTHER PUBLICATIONS

International Search Report and Written Opinion received for PCT Patent Application No. PCT/US2023/014142, mailed on Jun. 1, 2023, 12 pages.
(Continued)

*Primary Examiner* — Chuong T Ho
(74) *Attorney, Agent, or Firm* — Kipman T. Werking; Frontier IP Law PLLC

(57) ABSTRACT

Embodiments are directed towards systems and methods for managing user experiences during cellular telecommunication outages within a wireless telecommunication network, such as a wireless 5G network. Example embodiments include systems and methods for managing user experiences during a cellular telecommunication network outage involving network communication failure detection and performing different recovery actions in response to detecting a failure in communication between certain telecommunication network components and/or failure of certain network links. For example, the system may perform different recovery actions in response to the failure in communication being due to a detected inactive network link to the central unit control plane (CU-CP) versus the CU-CP itself being initially indicated as inactive

17 Claims, 20 Drawing Sheets

(51) Int. Cl.
*H04L 45/00* (2022.01)
*H04W 24/04* (2009.01)
*H04W 36/14* (2009.01)
*H04W 36/30* (2009.01)
*H04W 76/19* (2018.01)
*H04W 76/25* (2018.01)
*H04W 76/27* (2018.01)
*H04W 76/30* (2018.01)

(52) U.S. Cl.
CPC ......... *H04W 36/14* (2013.01); *H04W 36/305* (2018.08); *H04W 76/19* (2018.02); *H04W 76/25* (2018.02); *H04W 76/27* (2018.02); *H04W 76/30* (2018.02)

(58) Field of Classification Search
CPC ..... H04W 76/30; H04W 24/02; H04W 24/08; H04L 41/0654; H04L 45/22; H04L 43/10; H04L 41/0668; H04L 41/0895; H04L 41/16; H04L 41/147; H04L 41/40
USPC .................................. 370/216, 217, 218, 221
See application file for complete search history.

(56) References Cited

U.S. PATENT DOCUMENTS

| | | | |
|---|---|---|---|
| 2021/0194796 A1 | 6/2021 | Shariat et al. | |
| 2022/0124560 A1 | 4/2022 | Yeh et al. | |
| 2022/0132600 A1* | 4/2022 | Kim | H04W 76/30 |
| 2022/0132626 A1* | 4/2022 | Xu | H04W 76/11 |
| 2022/0151006 A1* | 5/2022 | Muhammad | H04W 76/19 |
| 2022/0272594 A1* | 8/2022 | Anderson | H04W 24/02 |
| 2022/0345896 A1* | 10/2022 | Ahmed | H04W 24/02 |
| 2022/0386404 A1 | 12/2022 | Fujishiro et al. | |
| 2023/0199524 A1* | 6/2023 | Singhal | H04W 24/04 370/217 |
| 2023/0276270 A1 | 8/2023 | Chenumolu et al. | |
| 2023/0276327 A1* | 8/2023 | Chenumolu | H04W 36/14 370/331 |
| 2023/0337018 A1 | 10/2023 | Mehta et al. | |
| 2023/0337019 A1 | 10/2023 | Mehta et al. | |
| 2023/0337311 A1* | 10/2023 | Teyeb | H04W 76/19 |
| 2024/0137108 A1* | 4/2024 | Li | H04W 24/02 |
| 2024/0323707 A1 | 9/2024 | Chandrashekar et al. | |

FOREIGN PATENT DOCUMENTS

| | | |
|---|---|---|
| WO | 2021/198232 A1 | 10/2021 |
| WO | 2022/066071 A1 | 3/2022 |

OTHER PUBLICATIONS

"3$^{rd}$ Generation Partnership Project; Technical Specification Group Radio Access Network; NG-RAN; Architecture description (Release 16)," 3GPP TS 38.401 V16.8.0, Dec. 2021, 79 pages.

Barzegar et al., Title: "Wireless Network Evolution Towards Service Continuity in 5G Enabled Mobile Edge Computing"; IEEE, 2020 Fifth International Conference on Fog and Mobile Edge Computing (FMEC) (Year: 2020).

Ioannis et al., Title: "5G for the Support of Public Safety Service", Wireless Personal Communications (2021) 120: 2321-2348, Accepted: Apr. 13, 2021 / Published online: May 20, 2021 https://doi.org/10.1007/s11277-021-08473-5 (Year: 2021).

ONF-SDRAN, Title: "ONF's Software-Defined RAN Platform Consistent with the O-RAN Architecture", Published: Feb. 2020; https://opennetworking.org/ (Year: 2020).

Parallel Wireless, Title: "Everything You Need To Know About Open RAN", https://www.parallelwireless.com/ published 2020. (Year: 2020).

Khatibi and Correia EURASIP Journal on Wireless Communications, and Networking; Title: "Modelling Virtual radio resource management in full heterogeneous networks"; 2017:73 DOI 10.1186/s13638-017-0858-7 (Year: 2017).

Koutlia et al., Research Article: "Design and Experimental Validation of a Software-Defined Radio Access Network Testbed with Slicing Support", Hindwai Wireless Communications and Mobile Computing Volume 2019, Article ID 2361352, 17 pages (Year: 2019).

Schmidt, Robert. "Slicing in heterogeneous software-defined radio access networks". Doctoral Dissertation. Sorbonne Universite, 2021. (Year: 2021).

* cited by examiner

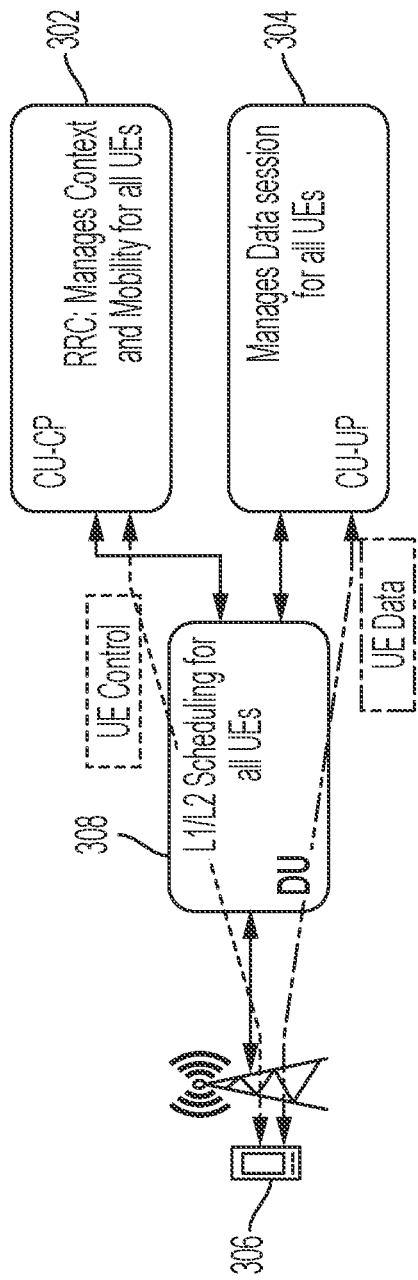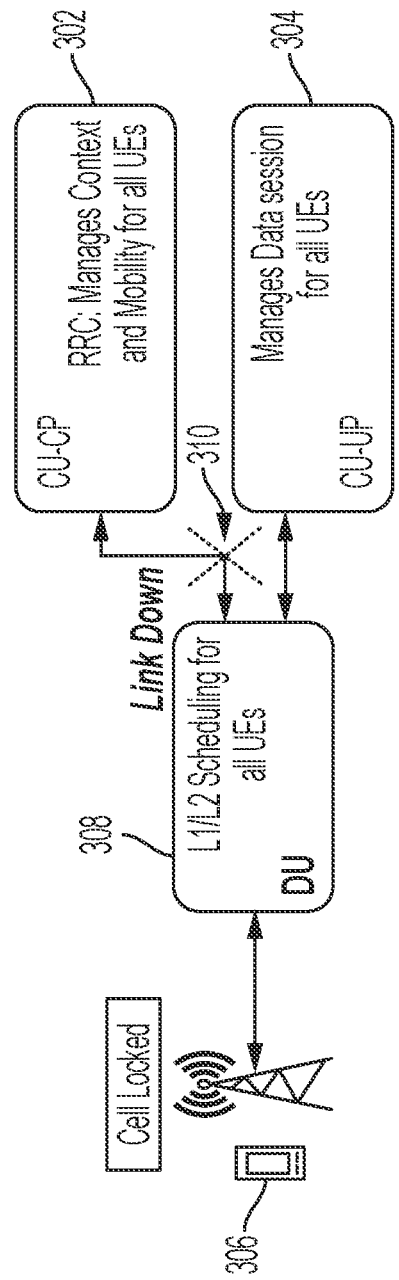
FIG. 3A
FIG. 3B

LINK FAILURE DETECTION BETWEEN DISTRIBUTED UNIT (DU) AND CENTRAL UNIT CONTROL PLANE (CU-CP)

TECHNICAL FIELD

The present disclosure relates generally to telecommunication networks, and more particularly, to managing user experiences during cellular telecommunication outages.

BRIEF SUMMARY

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of Fifth Generation (5G) wireless technology has resulted in faster speeds and increased bandwidth, but network outages can still cause undesired interruptions in service. Thus, minimizing such interruptions is important to providing a resilient and stable network. It is with respect to these and other considerations that the embodiments described herein have been made.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtual RAN with interfaces creating additional data access points.

5G network functions may be completely software-based and designed as cloud-native, meaning that they're agnostic to the underlying cloud infrastructure, allowing higher deployment, agility and flexibility.

With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Briefly described, embodiments disclosed herein are directed toward systems and methods for managing user experiences during cellular telecommunication outages within a wireless telecommunication network, such as a wireless 5G network. Example embodiments include systems and methods for managing user experiences during a cellular telecommunication network outage involving network communication failure detection; performing different recovery actions in response to detecting a failure in communication between certain telecommunication network components and/or failure of certain network links; managing user experiences during a cellular telecommunication network outage involving radio resource manager (RRM) in the DU; managing user experiences during a cellular telecommunication network outage involving the RRM redirecting user equipment devices (UEs); managing user experiences during cellular telecommunication network outages involving an intelligence layer module, which makes predictions regarding future communication failures, in communication with the DU; managing user experiences during a cellular telecommunication network outage utilizing a backup data center; resizing a containerized group of microservices corresponding to CUs that will be resized to allow new CUs to be added for managing user experiences during a cellular telecommunication network outage; and utilizing an intelligence layer module external to the DU and in communication with the DU, a primary physical data center and a backup physical data center for managing user experiences during a cellular telecommunication network outage.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 3A is a diagram showing connectivity between certain telecommunication network components during cellular telecommunication in accordance with embodiments described herein.

FIG. 3B is a diagram showing of loss of connectivity between certain telecommunication network components of FIG. 3A which may occur during cellular telecommunication outage and for which managing user experiences during cellular telecommunication outage may be implemented in accordance with embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
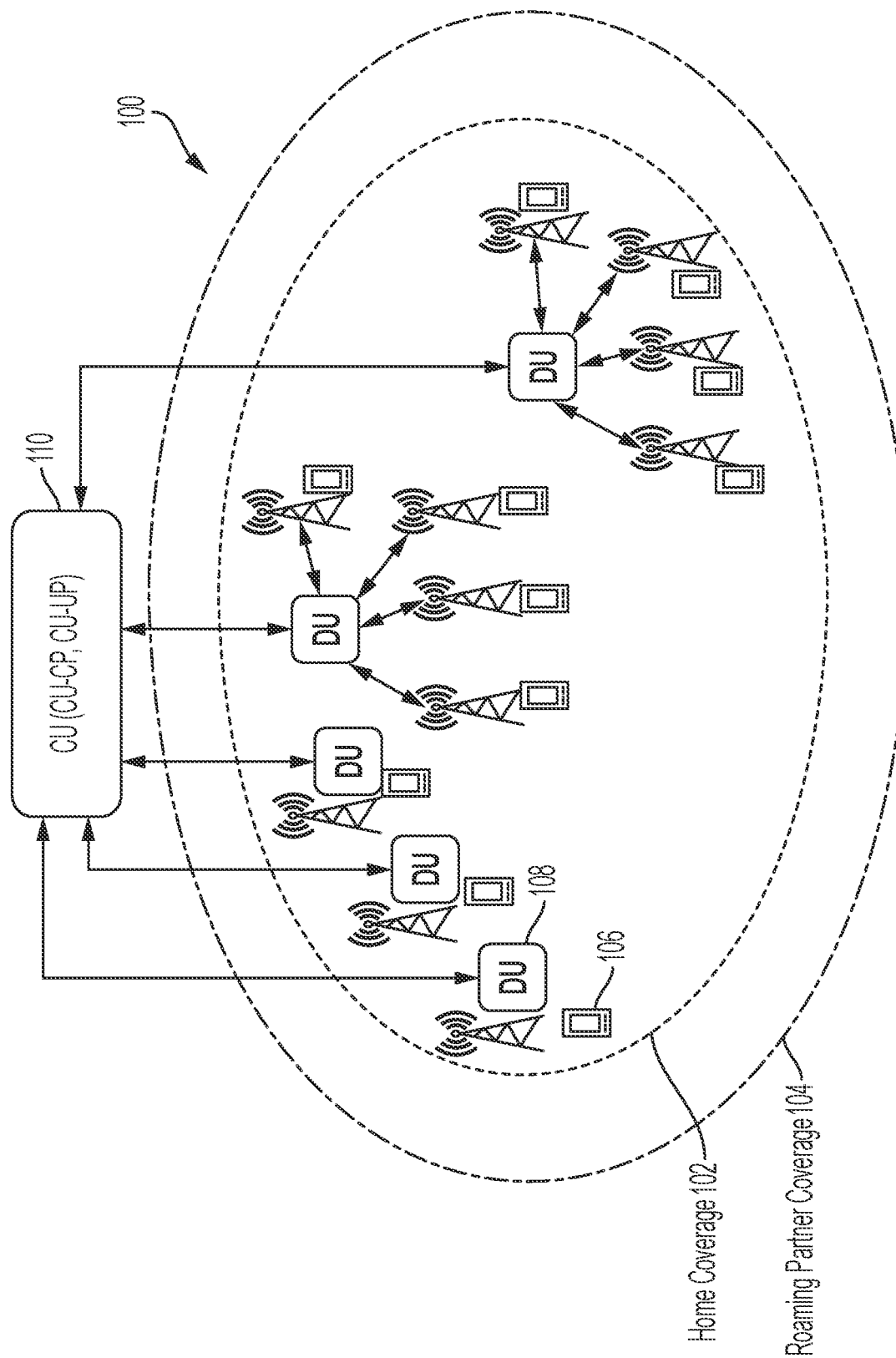
FIG. 1 illustrates a context diagram of an environment in which managing user experiences during cellular telecommunication outage may be implemented in accordance with embodiments described herein.

FIG. 1 illustrates a context diagram of an environment in which managing user experiences during cellular telecommunication outages may be implemented in accordance with embodiments described herein.

A given area 100 will mostly be covered by two or more mobile network operators' wireless networks. Generally, mobile network operators have some roaming agreements that allow users to roam from home network to partner network under certain conditions, shown in FIG. 1 as home network coverage area 102 and roaming partner network coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE will scan for a roaming network after a timer expiration (6 minutes, for example). This could have significant impact on customer experience in case of a catastrophic failure in the network. As shown in FIG. 1, a 5G RAN is split into DUs (e.g., DU 108) that manage scheduling of all the users and a CU that manages the mobility and radio resource control (RRC) state for all the UEs. The RRC is a layer within the 5G NR protocol stack. It exists only in the control plane, in the UE and in the gNb. The behavior and functions of RRC are governed by the current state of RRC. In 5G NR, RRC has three distinct states: RRC_IDLE, RRC_CONNECTED and RRC_INACTIVE.

Figure 2:
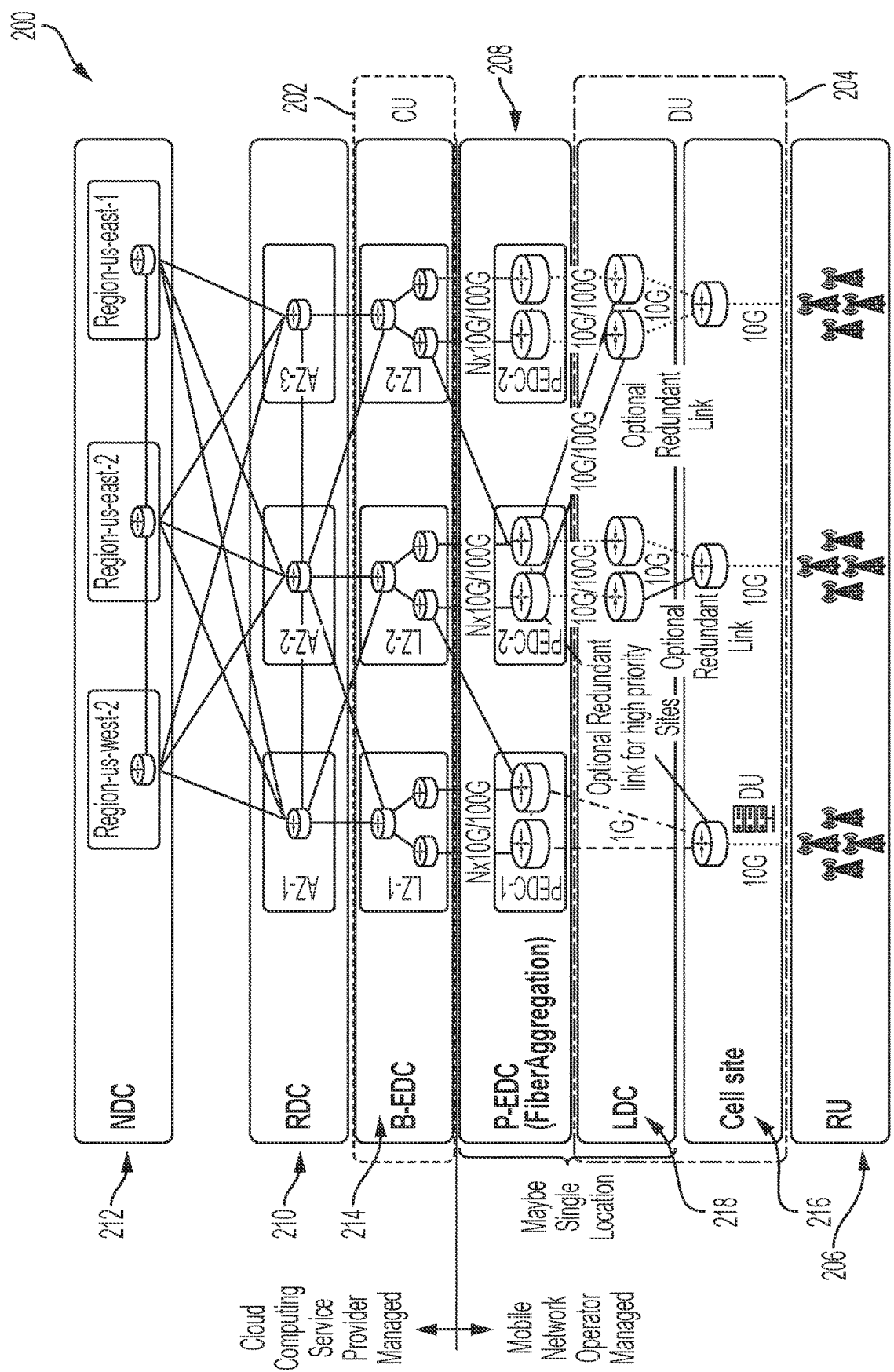
FIG. 2 illustrates a diagram of an example system architecture overview of a system in which the environment of FIG. 1 may be implemented in accordance with embodiments described herein.

FIG. 2 illustrates a diagram of an example system architecture overview of a system 200 in which the environment of FIG. 1 may be implemented in accordance with embodiments described herein.

As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 202.

The CU 202 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 202 and DU 204 depending on midhaul availability and network design. The CU 202 is a logical node that includes the gNb functions like transfer of user data, mobility control, RAN sharing, positioning, session management etc., with the exception of functions that may be allocated exclusively to the DU 204. The CU 202 controls the operation of several DUs 204 over the midhaul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a bifurcated edge data center (B-EDC) 214. As shown in FIG. 2, the DU 204 may be provisioned to communicate via a pass through edge data center (P-EDC) 208. The P-EDC 208 may provide a direct circuit fiber connection from the DU directly to the primary physical data center (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

FIG. 3A is a diagram showing connectivity between certain telecommunication network components during cellular telecommunication in accordance with embodiments described herein.

The central unit control plane (CU-CP), for example, of CU 110 of FIG. 1 or CU 202 of FIG. 2, primarily manages control processing of DUs, such as DU 308, and UEs, such as UE 302. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

FIG. 3B is a diagram showing of loss of connectivity between certain telecommunication network components of FIG. 3A which may occur during cellular telecommunication outage and for which managing user experiences during cellular telecommunication outage may be implemented in accordance with embodiments described herein.

As shown in FIG. 3B, if the DU 308 loses connectivity with the CU-CP 302, illustrated by the link down indication 310, it will shut down all the cells that it is currently managing. All UEs 306 under the coverage of the DU 308 will not have any service and there will be no e911 service within that coverage until the link between the DU 308 and the CU-UP 304 is re-established.

Figure 4:
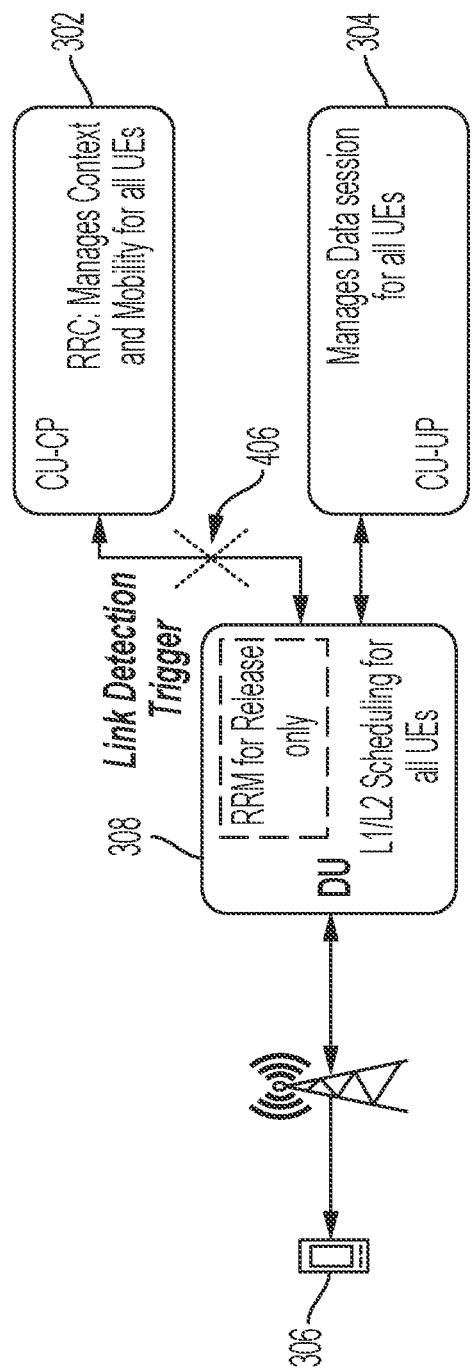
FIG. 4 illustrates a diagram showing link failure detection including a failure in communication between certain telecommunication network components in accordance with embodiments described herein.

FIG. 4 illustrates a diagram showing link failure detection including a failure in communication between certain telecommunication network components in accordance with embodiments described herein.

The DU 308 will send a heartbeat request to the CU-CP IP 302 at a preconfigured interval and retries for a preconfigured amount of time or number of requests. This indicates if CU is active or inactive. The DU 308 will send a heartbeat request to CU-CP 302 default Gateway Internet Protocol (IP) address at a preconfigured interval and retries for a preconfigured amount of time or number of requests. This indicates if the network link to the CU is active or inactive. If the DU 308 detects that the network link is not active, it will immediately send the RRC Release message to all UEs 306 serviced by the DU 308. If the DU 308 detects the CU is not available after the retries have been exhausted, the DU will send an RRC Release message to all UEs 306 serviced by the DU 308.

Figure 5:
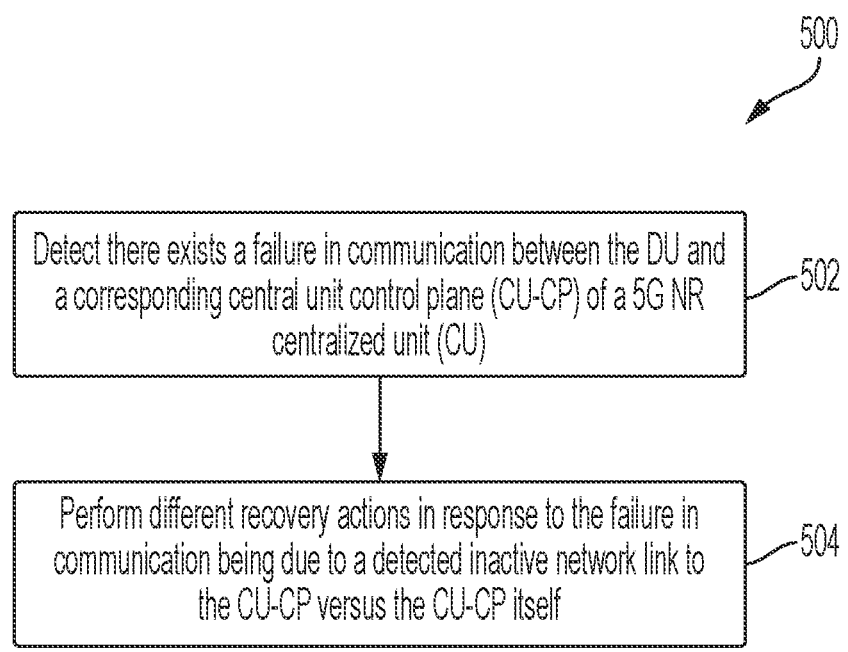
FIG. 5 illustrates a logical flow diagram showing one embodiment of a process for managing user experiences during a cellular telecommunication network outage involving network communication failure detection in accordance with embodiments described herein.

FIG. 5 illustrates a logical flow diagram showing one embodiment of a process 500 for managing user experiences during a cellular telecommunication network outage involving network communication failure detection in accordance with embodiments described herein.

At 502, a distributed unit (DU) of a fifth-generation New Radio (5G NR) cellular telecommunication network detects there exists a failure in communication between the DU and a corresponding central unit control plane (CU-CP) of a 5G NR centralized unit (CU).

At 504, different recovery actions are performed in response to the failure in communication being due to a detected inactive network link to the CU-CP versus the CU-CP itself being initially indicated as inactive.

Figure 6:
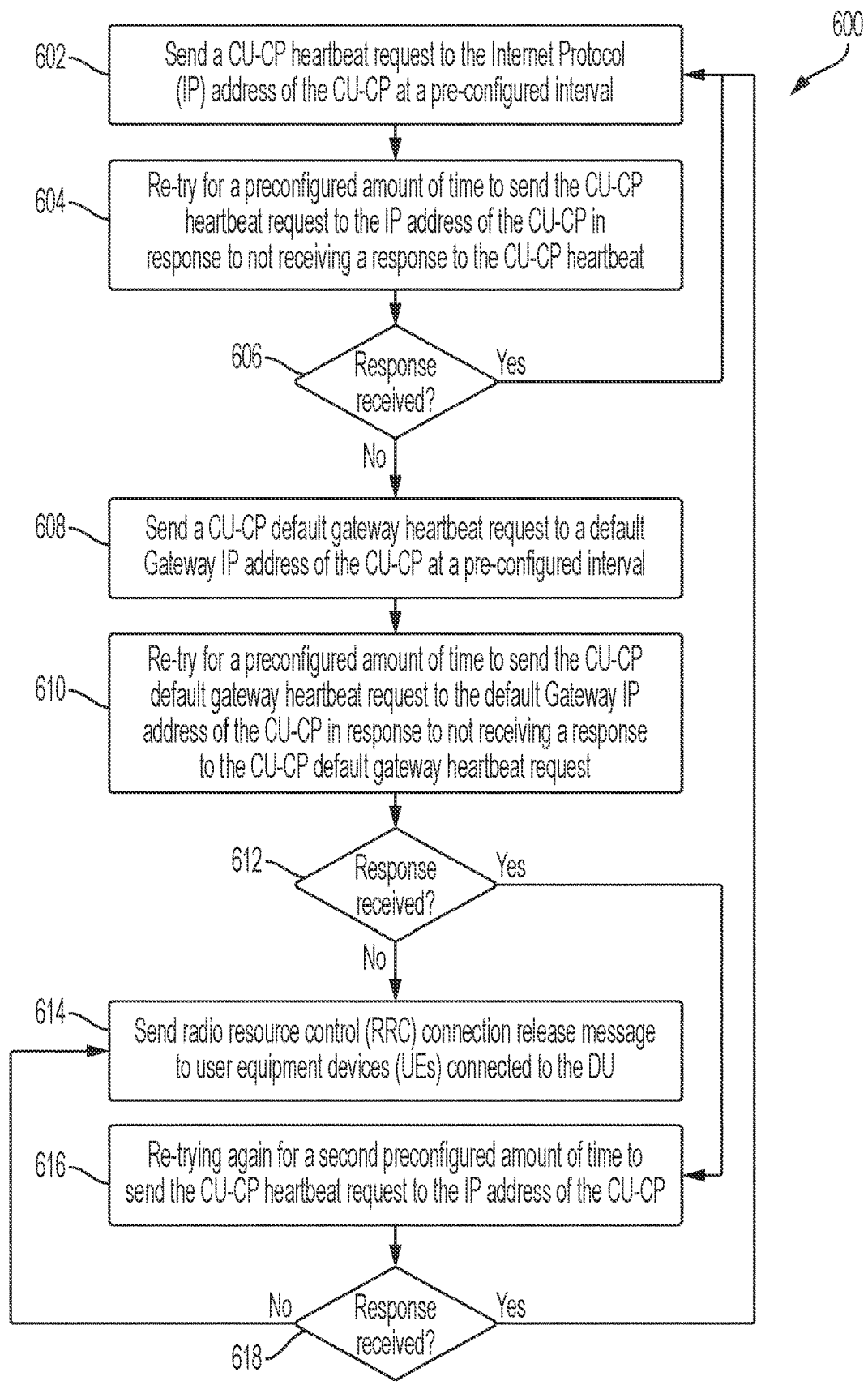
FIG. 6 illustrates a logical flow diagram showing one embodiment of a process for performing different recovery actions in response to the failure in communication between certain telecommunication network components in accordance with embodiments described herein.

FIG. 6 illustrates a logical flow diagram showing one embodiment of a process 600 for performing different recovery actions in response to the failure in communication between certain telecommunication network components in accordance with embodiments described herein.

At 602, the DU sends a CU-CP heartbeat request to the Internet Protocol (IP) address of the CU-CP at a preconfigured interval.

At 604, the DU re-tries for a preconfigured amount of time to send the CU-CP heartbeat request to the IP address of the CU-CP in response to not receiving a response to the CU-CP heartbeat request.

At 606, it is determined whether a response was received to the re-trying for the preconfigured amount of time to send the CU-CP heartbeat request to the IP address of the CU-CP. If a response was received to the re-trying for the preconfigured amount of time to send the CU-CP heartbeat request to the IP address of the CU-CP, then the CU is active and the process proceeds to 602.

At 608, in response to not receiving a response to the re-trying for the preconfigured amount of time to send the CU-CP heartbeat request to the IP address of the CU-CP, the DU sends a CU-CP default gateway heartbeat request to a default Gateway IP address of the CU-CP at a pre-configured interval.

At 610, the DU re-tries for a preconfigured amount of time to send the CU-CP default gateway heartbeat request to the default Gateway IP address of the CU-CP in response to not receiving a response to the CU-CP default gateway heartbeat request.

At 612, it is determined whether a response was received to the re-trying the preconfigured number of times to send the CU-CP default gateway heartbeat request to default Gateway Internet Protocol IP address of the CU-CP. If a response was received to the re-trying the preconfigured number of times to send the CU-CP default gateway heartbeat request to default Gateway Internet Protocol IP address of the CU-CP, then the CU is active and process proceeds to 616.

At 614, it is determined that there is an inactive network link to the CU-CP based on not receiving a response to the re-trying the preconfigured number of times to send the CU-CP default gateway heartbeat request to default Gateway Internet Protocol IP address of the CU-CP. In response to a determination there is an inactive network link to the CU-CP, the DU immediately sends a radio resource control (RRC) connection release message to user equipment devices (UEs) connected to the DU. The RRC Connection Release message is used by the gNb entity to release the RRC connection of a UE, such as to enable it to connect to another network. The procedure can also be used to redirect the UE to a different frequency band.

At 616, it is determined there is not an inactive network link to the CU-CP based on receiving a response to the CU-CP default gateway heartbeat request to the default Gateway IP address of the CU-CP. In response to the determination there is not an inactive network link to the CU-CP, the DU re-tries again for a second preconfigured amount of time to send the CU-CP heartbeat request to the IP address of the CU-CP. This is to avoid releasing the UE prematurely when the network link to the CU-CP is active, but it is just the CU-CP itself that may be inactive for a relatively short amount of time.

At 618, it is determined whether a response was received to the re-trying again for a second preconfigured amount of time to send the CU-CP heartbeat request to the IP address of the CU-CP. If a response was received to the re-trying again for a second preconfigured amount of time to send the CU-CP heartbeat request to the IP address of the CU-CP, then the CU is active and the process proceeds to 602. If a response was not received to the re-trying again for the second preconfigured amount of time to send the CU-CP heartbeat request to the IP address of the CU-CP, then the process proceeds to 614. As explained above, at 614, the DU sends an RRC connection release message to UEs connected to the DU.

In various other embodiments, in the process 600, instead of a preconfigured amount of time, the DU may retry for a preconfigured number of heartbeat requests to the IP address of the CU-CP and/or to the IP address of the CU-CP.

Figure 7:
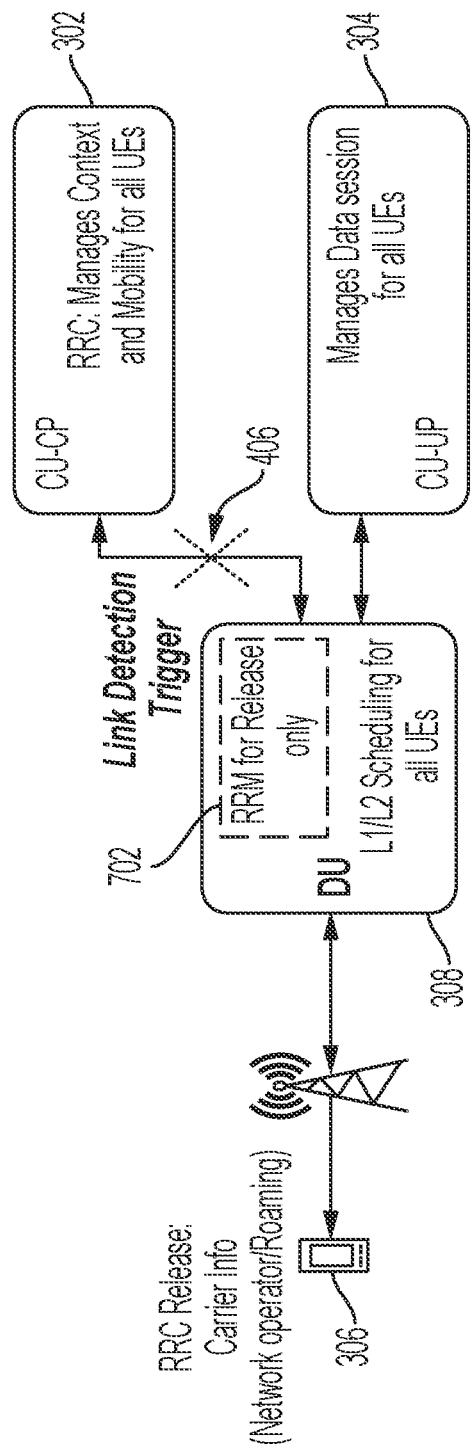
FIG. 7 illustrates a diagram showing a radio resource management (RRM) module in a telecommunication network component for managing user experiences during a cellular telecommunication network outage in accordance with embodiments described herein.

FIG. 7 illustrates a diagram showing a radio resource management (RRM) module 702 in a telecommunication network component for managing user experiences during a cellular telecommunication network outage in accordance with embodiments described herein.

Shown in FIG. 7 is an RRM 702 in the DU 308. In an example embodiment, the RRM 702 in the DU 308 will only be active when the DU 308 detects link failure 406 towards CU-UP 302. Instead of sending an RRC Release message, UEs 306 may be redirected to the roaming partner or other carrier of the mobile network operator served by another cell site. The trigger for configuring the carrier for release can be pre-configured or provided by an Orchestrator or any external entity outside the RAN.

Figure 8:
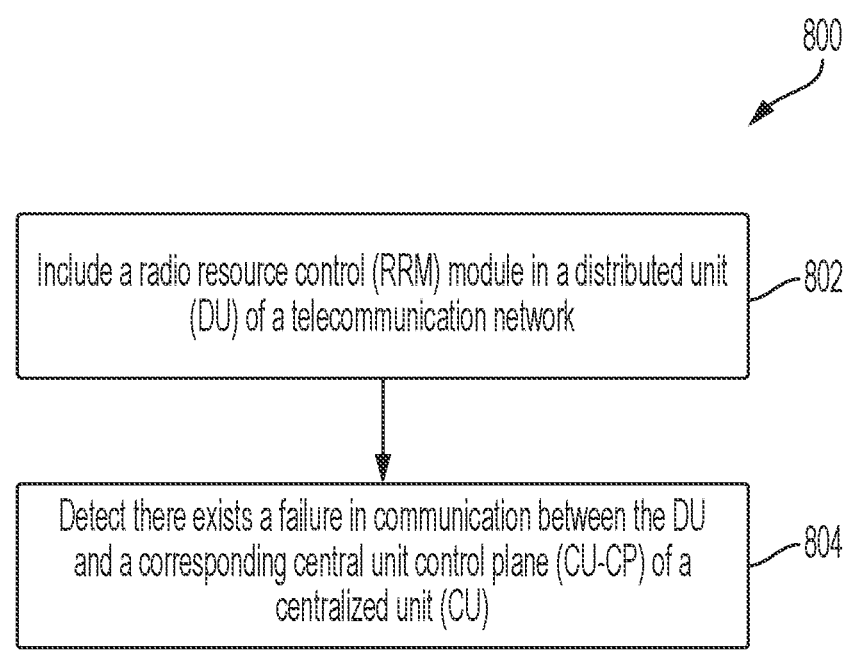
FIG. 8 illustrates a logical flow diagram showing one embodiment of a process for managing user experiences during a cellular telecommunication network outage involving an RRM.

FIG. 8 illustrates a logical flow diagram showing one embodiment of a process 800 for managing user experiences during a cellular telecommunication network outage involving an RRM.

At 802, an RRM module is included in a distributed unit (DU) of a fifth-generation New Radio (5G NR) cellular telecommunication radio access network (RAN) provided by a particular mobile network operator and served by a particular 5G NR cellular site base station.

At 804, the DU (not the RRM) detects there exists a failure in communication between the DU and a corresponding central unit control plane (CU-CP) of a 5G NR centralized unit (CU). The DU detecting there exists a failure in communication between the DU and a corresponding central unit control plane (CU-CP) may include the DU detecting an inactive network link to the CU-CP or detecting an inactive CU-CP.

Figure 9:
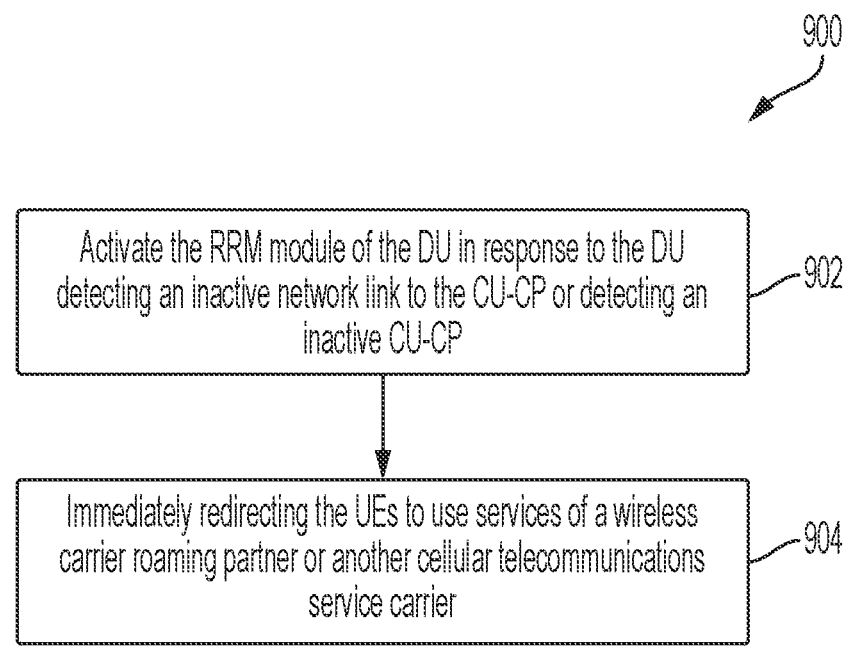
FIG. 9 illustrates a logical flow diagram showing one embodiment of a process for managing user experiences during a cellular telecommunication network outage involving the RRM redirecting user equipment devices (UEs) in accordance with embodiments described herein.

FIG. 9 illustrates a logical flow diagram showing one embodiment of a process 900 for managing user experiences during a cellular telecommunication network outage involving the RRM redirecting user equipment devices (UEs) in accordance with embodiments described herein.

At 902, in response to the DU detecting an inactive network link to the CU-CP or detecting an inactive CU-CP, the radio resource management (RRM) module of the DU is activated.

At 904, instead of sending a radio resource control (RRC) connection release message to user equipment devices (UEs) connected to the DU 308, the RRM 702 of the DU immediately redirects the UEs to use services of a wireless carrier roaming partner of the particular mobile network operator or another cellular telecommunications service carrier of the particular mobile network operator serviced by another cellular site base station. In various embodiments, the UEs may be redirected to use services of a wireless carrier roaming partner of the particular mobile network operator in some instances or another cellular telecommunications service carrier of the particular mobile network operator serviced by another cellular site base station in other instances based on various conditions, including those later described herein.

Before the DU detects there exists the failure in communication between the DU and the corresponding CU-CP, the RRM 702 in the DU may be pre-configured to send the radio resource control RRC connection release message to the UEs after detecting there exists the failure in communication between the DU and the corresponding CU-CP according to one or more pre-configured triggers.

In an example embodiment, before the DU detects there exists the failure in communication between the DU and the corresponding CU-CP, the RRM in the DU may be pre-configured to perform one or more actions regarding redirecting the UEs to reduce service interruption after detecting there exists the failure in communication between the DU and the corresponding CU-CP according to one or more pre-configured triggers. These actions may include: redirecting one or more of the UEs to use a particular pre-configured frequency; redirecting one or more of the UEs to use services of a particular wireless carrier roaming partner of the particular mobile network operator; or redirecting one or more of the UEs to use services of another cellular telecommunications service carrier of the particular mobile network operator serviced by another cellular site base station. For example, the above pre-configuring may be performed by a network orchestrator or another external entity outside the RAN.

Figure 10:
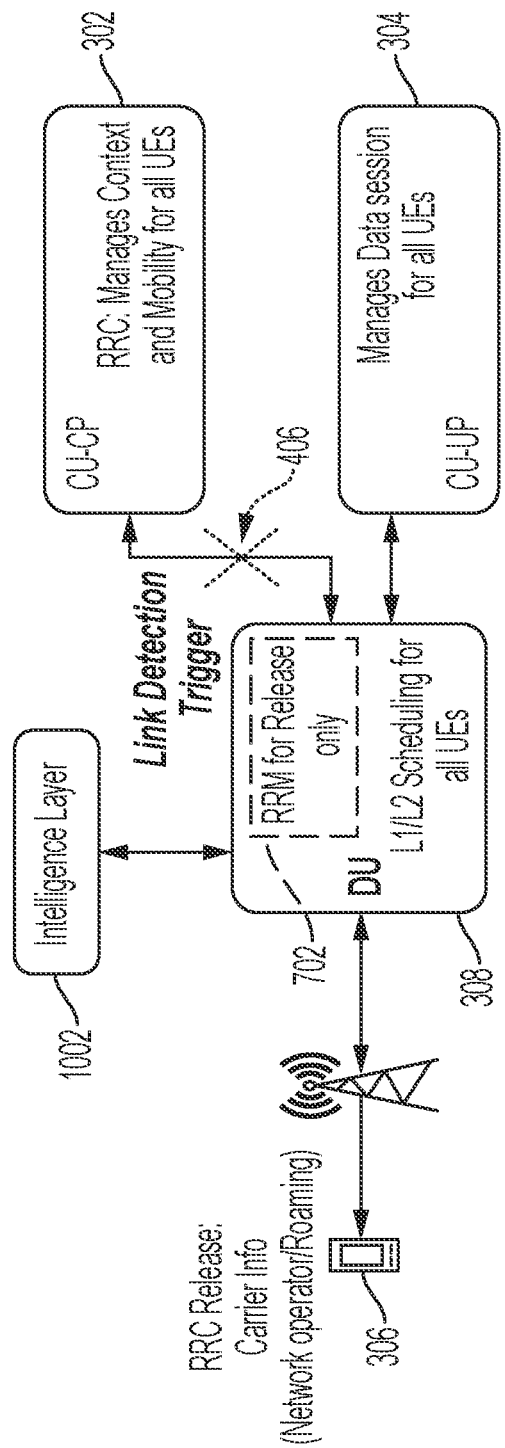
FIG. 10 illustrates a diagram showing an intelligence layer module in communication with a telecommunication network component for managing user experiences during a cellular telecommunication network outage in accordance with embodiments described herein.

FIG. 10 illustrates a diagram showing an intelligence layer module in communication with a telecommunication network component for managing user experiences during a cellular telecommunication network outage in accordance with embodiments described herein.

As shown in FIG. 10, the DU 308 is communicating with intelligence layer module 1002, and the RRM 702 in the DU 308 may be activated and managed by the intelligence layer module 1002. When the DU 308 detects a link failure 406 towards the CU-CP 302 (e.g., after the first heartbeat response failure), the intelligence layer module 1002 is notified. Optionally, in response to the first heartbeat failure, the intelligence layer module 1002 may start moving high priority users (i.e., UEs associated with high priority users) to other carriers. Optionally, in response to all heartbeat failures after retries have been exhausted, the intelligence layer module 1002 may start moving low priority users (i.e., UEs associated with high priority users) to other carriers. In some embodiments, the Intelligence layer module 1002 may use previous data and artificial intelligence (AI)/machine learning (ML) models to predict which type of users to move. The intelligence layer module 1002 may use previous data and AI/ML models to predict if users are required to be moved or should be served under same cell site after recovery of the DU or network link.

In some embodiments, the intelligence layer may provide the frequency to which the UE is redirected based on or according to each kind or type of UE, For example, UEs can be redirected to the roaming partner or UEs can be redirected to another carrier of the mobile network operator served by another cell site. In various embodiments, the trigger for configuring the carrier for release may be pre-configured or provided by an orchestrator or any external entity outside the RAN as an input to the intelligence layer module 1002.

Figure 11:
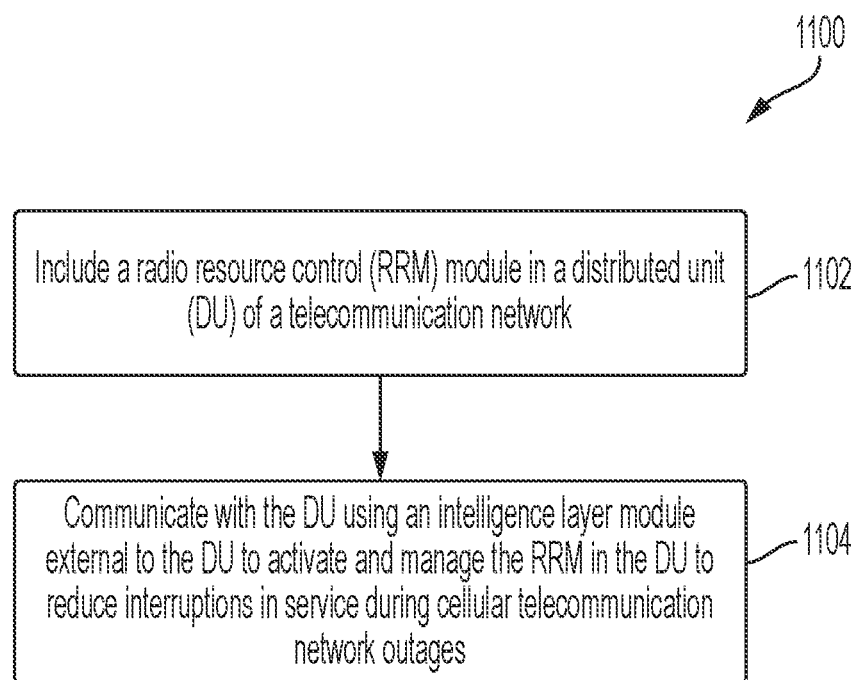
FIG. 11 illustrates a logical flow diagram showing one embodiment of a process for managing user experiences during a cellular telecommunication network outage involving an intelligence layer module in accordance with embodiments described herein.

FIG. 11 illustrates a logical flow diagram showing one embodiment of a process 1100 for managing user experiences during cellular telecommunication network outages involving an intelligence layer module in accordance with embodiments described herein.

At 1102, radio resource management (RRM) module is included in a distributed unit (DU) of a fifth-generation New Radio (5G NR) cellular telecommunication radio access network (RAN). The DU is served by a corresponding central unit control plane (CU-CP) of a 5G NR centralized unit (CU). The 5G NR RAN is provided by a particular mobile network operator and served by a particular 5G NR cellular site base station.

At 1104, an intelligence layer module external to the DU communicates with the DU to activate and manage the RRM in the DU to reduce interruptions in service during cellular telecommunication network outages.

In an example embodiment, the DU sends a CU-CP heartbeat request to the Internet Protocol (IP) address of the CU-CP or to a default Gateway IP address of the CU-CP at a pre-configured interval. In response to a first failure to receive a response to the heartbeat request after previously receiving a response to the heartbeat request, the intelligence layer immediately initiates redirection of selected high priority UEs connected to the DU to use services of a wireless carrier roaming partner of the particular mobile network operator or another cellular telecommunications service carrier of the particular mobile network operator serviced by another cellular site base station.

In an example embodiment, the DU may re-try for a preconfigured amount of time or a pre-configured number of heartbeat requests, to send the heartbeat request in response to not receiving a response to the heartbeat request. In response to not receiving a response to the re-trying, the intelligence layer module may immediately initiate redirection of all other UEs connected to the DU, besides the selected high priority UEs for which the intelligence layer has already initiated redirection, to use services of the wireless carrier roaming partner of the particular mobile network operator or another cellular telecommunications service carrier of the particular mobile network operator serviced by another cellular site base station.

Figure 12:
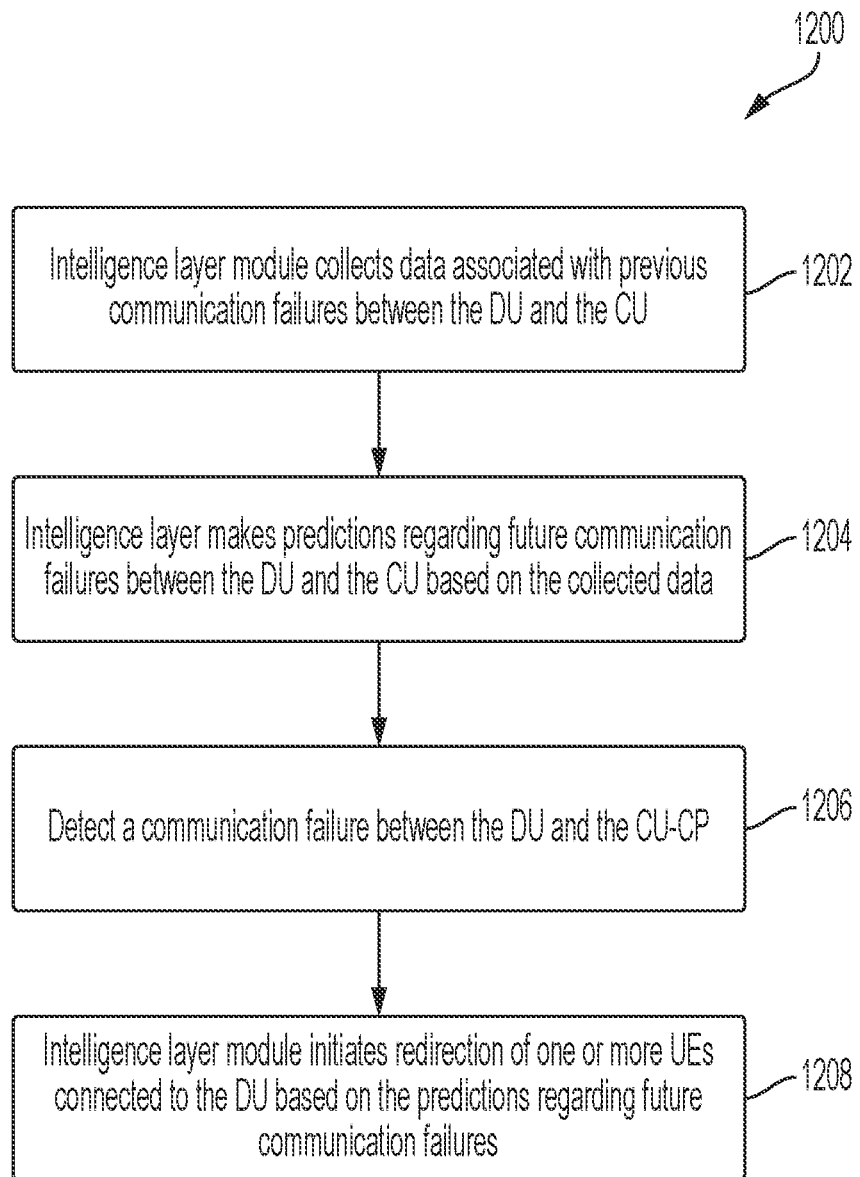
FIG. 12 illustrates a logical flow diagram showing one embodiment of a process for managing user experiences during a cellular telecommunication network outage involving an intelligence layer making predictions regarding future communication failures in accordance with embodiments described herein.

FIG. 12 illustrates a logical flow diagram showing one embodiment of a process 1200 for managing user experiences during cellular telecommunication network outages involving an intelligence layer making predictions regarding future communication failures in accordance with embodiments described herein.

At 1202, the intelligence layer module collects data associated with previous communication failures between the DU and the CU regarding one or more of: the DU, the CU-CP and a communication link between the DU and the CU-CP.

At 1204, the intelligence layer module makes predictions regarding future communication failures between the DU and the CU based on the collected data associated with previous communication failures between the DU and the CU-CP. The predictions may be made utilizing an artificial intelligence (AI) or machine learning (ML) model that learns from the collected data associated with previous communication failures between the DU and the CU-CP how to make more accurate predictions regarding recovery times of future communication failures between the DU and the CU-CP.

At 1206, the DU detects a communication failure between the DU and the CU-CP.

At 1208, in response to the detected communication failure between the DU and the CU-CP, the intelligence layer module initiates redirection of one or more UEs connected to the DU, based on the predictions regarding future communication failures between the DU and the CU-CP. The redirection may be to use services of the wireless carrier roaming partner of the particular mobile network operator or another cellular telecommunications service carrier of the particular mobile network operator serviced by another cellular site base station.

Before the DU detects the communication failure between the DU and the CU-CP, the intelligence layer module may pre-configure the DU to perform one or more actions regarding redirecting the one or more UEs to reduce service interruption after detecting the communication failure between the DU and the CU-CP according to one or more pre-configured triggers.

In some embodiments, the predictions regarding future communication failures between the DU and the CU-CP include predictions regarding recovery time of communication failures between the DU and the CU-CP. The initiating redirection of one or more UEs may include selecting which UEs connected to the DU to redirect based on a predicted recovery time of the detected communication failure.

Figure 13A:
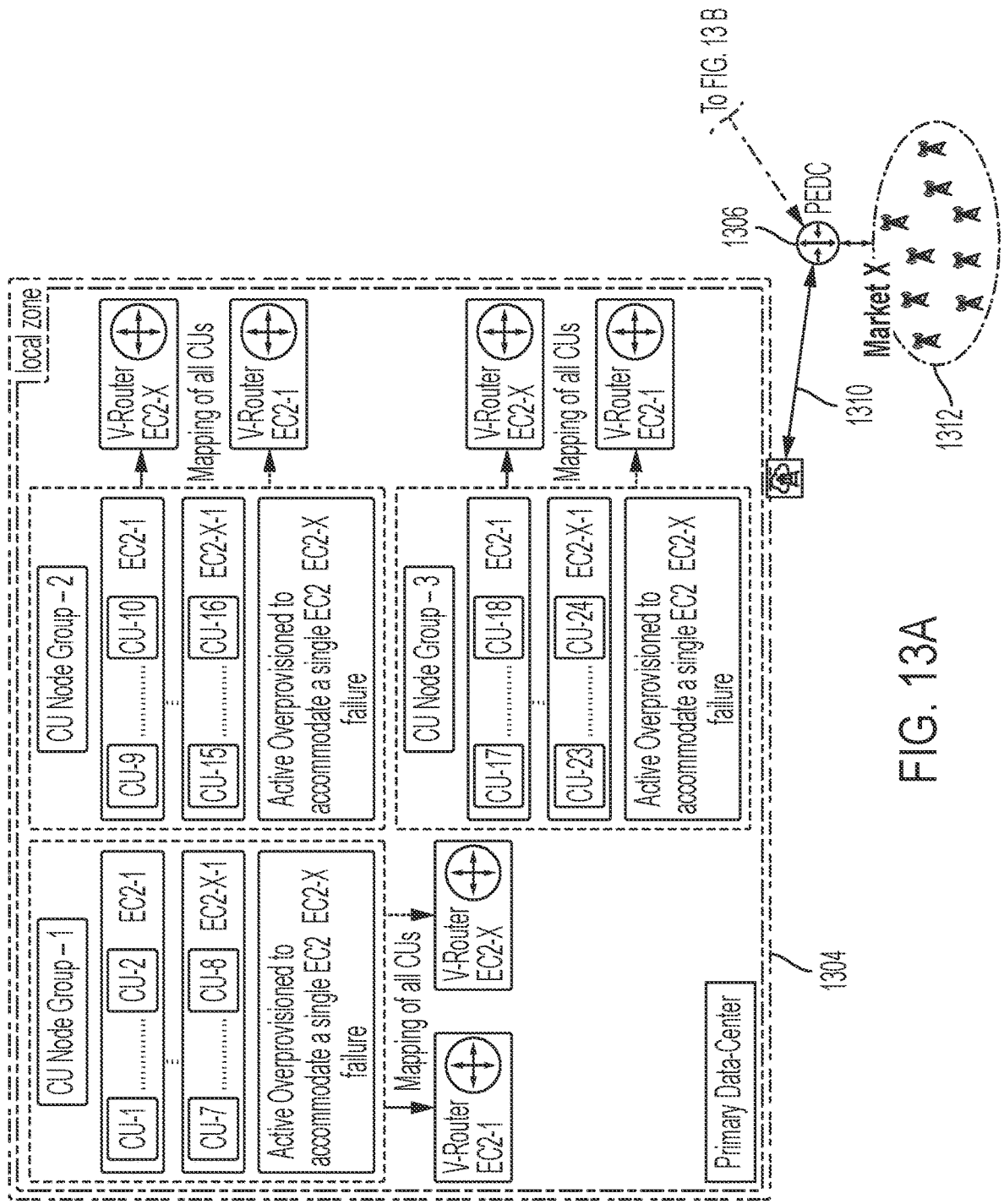
FIG. 13A-13B illustrate a diagram showing a backup data center in communication with telecommunication network components for managing user experiences during a cellular telecommunication network outage in accordance with embodiments described herein.
Figure 13B:
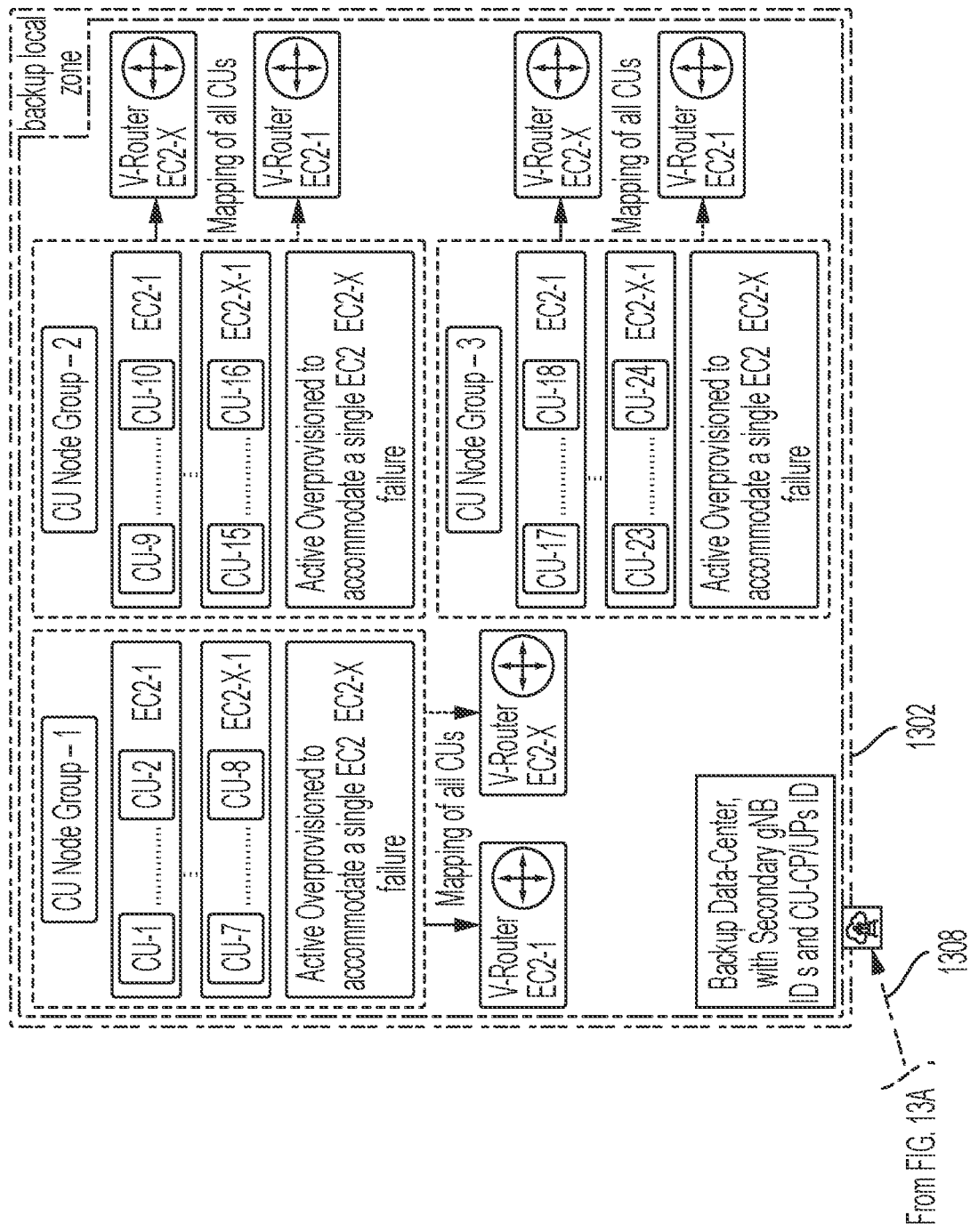

FIG. 13A-13B illustrate a diagram showing a backup data center 1302 in communication with telecommunication network components for managing user experiences during a cellular telecommunication network outage in accordance with embodiments described herein.

As shown in FIGS. 13A-13B, there is a backup data center 1302 at a backup location where a light flavor of the CU-CP and CU-UP (e.g., providing less bandwidth capabilities) may be instantiated within a CU node group using secondary IDs (i.e., a secondary gNb ID) and configuration. Secondary IDs may be pre-configured on the DUs within market X 1312 that communicate with the primary data center 1304 and backup data center via a pass through edge data center (PEDC) 1306. In an example embodiment, the DU will be provisioned to use the secondary IDs only when there is a failure detected in the link 1310 towards the primary CU hosted at the primary data center 1304. This results in minimal service interruption for users while the DU re-establishes connection via link 1308 with secondary CUs instantiated in the backup data center 1302. In an example embodiment, service will be provided with limited bandwidth (BW) available to support basic quality of service (QoS) until the connection to primary CUs is restored.

Figure 14:
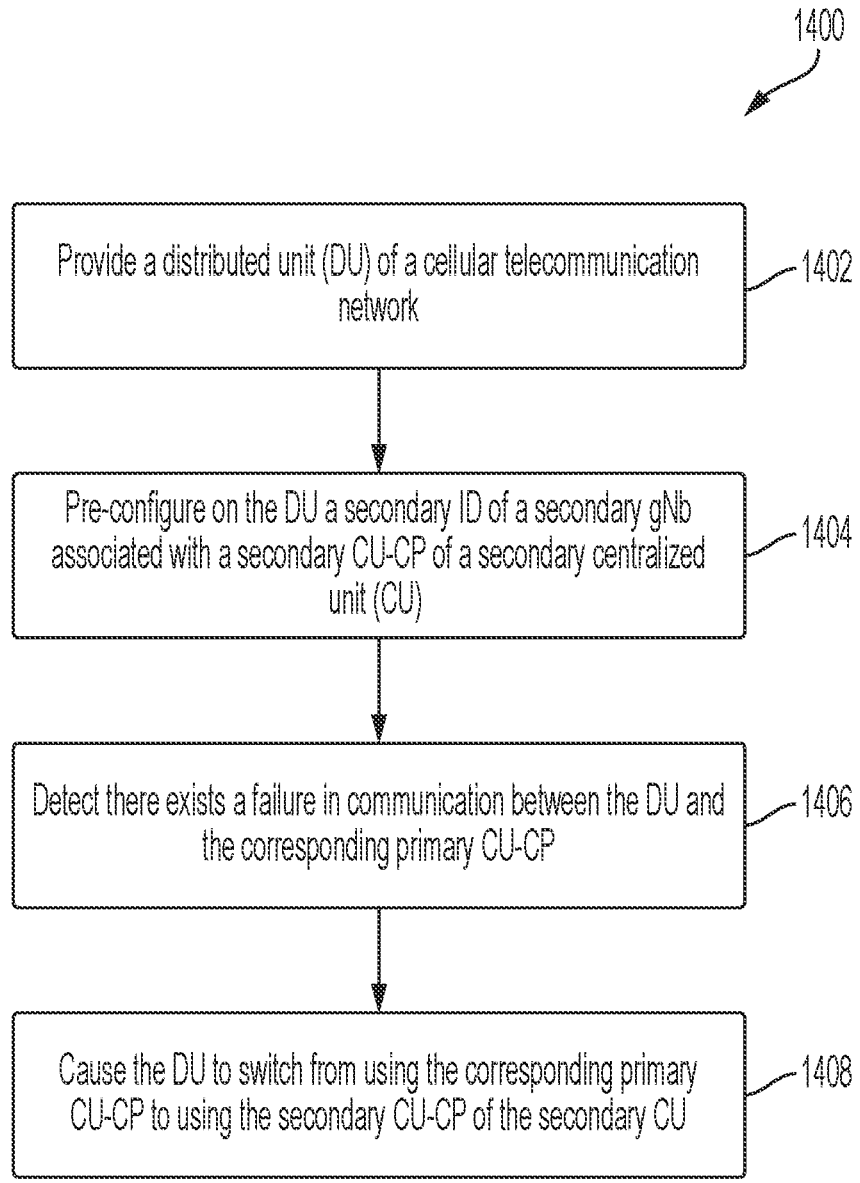
FIG. 14 illustrates a logical flow diagram showing one embodiment of a process for managing user experiences during a cellular telecommunication network outage utilizing a backup data center in accordance with embodiments described herein.

FIG. 14 illustrates a logical flow diagram showing one embodiment of a process 1400 for managing user experiences during cellular telecommunication network outages utilizing a backup data center in accordance with embodiments described herein.

At 1402, a mobile network operator provides a distributed unit (DU) of a fifth-generation New Radio (5G NR) cellular telecommunication network radio access network (RAN) that is served by a particular 5G NR cellular site base station. The DU is associated with a primary 5G NR Next Generation Node B (gNb) identified by a primary identifier (ID). The DU is in operable communication with a corresponding primary central unit control plane (CU-CP) of a 5G NR primary centralized unit (CU) that is hosted on a cloud-native virtualized compute instance in a primary physical data center and is also associated with the primary gNb identified by the primary ID.

At 1404, the system pre-configures on the DU a secondary ID of a secondary gNb associated with a secondary CU-CP of a secondary 5G NR CU. The secondary CU is hosted on a backup cloud-native virtualized compute instance in a backup physical data center separate from the primary physical data center. In some embodiments, the secondary CU-CP on the backup cloud-native virtualized compute instance provides more limited bandwidth capabilities to the DU as compared to the primary CU-CP.

At 1406, the DU detects there exists a failure in communication between the DU and the corresponding primary CU-CP.

At 1408, in response to the DU detecting there exists a failure in communication between the DU and the corresponding primary CU-CP, the DU is caused to switch from using the corresponding primary CU-CP to using the secondary CU-CP based on utilizing the secondary ID pre-configured on the DU.

The secondary CU-CP may be instantiated on the backup cloud-native virtualized compute instance in response to the DU detecting there exists a failure in communication between the DU and the corresponding primary CU-CP before the DU switches from using the corresponding primary CU-CP to using the secondary CU-CP.

In some embodiments, all the DUs in operable communication with the primary CU-CP are provisioned to communicate via a pass through edge data center (P-EDC) with both the primary physical data center and the backup physical data center while communication between the DUs and the primary CU-CP is active. The P-EDC may provide a direct circuit fiber connection from all the DUs in operable communication with the primary CU-CP directly to the primary physical data center and the backup physical data center.

In some embodiments, after switching from using the corresponding primary CU-CP to using the secondary CU-CP of the secondary CU hosted on the backup cloud-native virtualized compute instance, the DU detects there no longer exists a failure in communication between the DU and the corresponding primary CU-CP. In response to the DU detecting there no longer exists a failure in communication between the DU and the corresponding primary CU-CP, the DU may switch back to using the corresponding primary CU-CP from using the secondary CU-CP of the secondary CU hosted on the backup cloud-native virtualized compute instance based on utilizing the primary ID.

Figure 15:
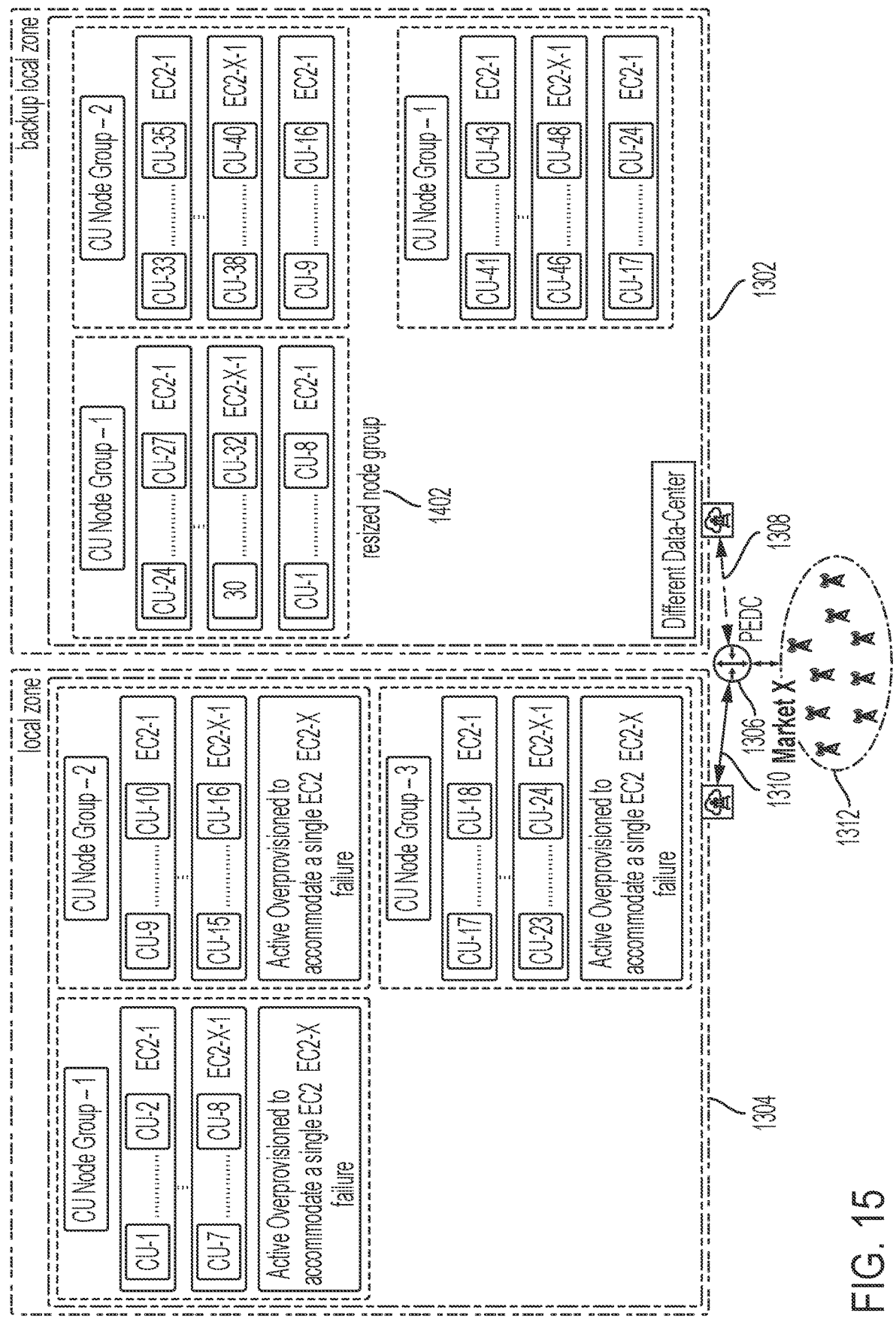
FIG. 15 illustrates a diagram showing a backup data center in which a containerized group of microservices corresponding to CUs will be resized to allow new CUs to be added for managing user experiences during a cellular telecommunication network outage in accordance with embodiments described herein.

FIG. 15 illustrates a diagram showing a backup data center 1302 in which a containerized group of microservices (Node Group 1402) corresponding to CUs will be resized to allow new CUs to be added for managing user experiences during a cellular telecommunication network outage in accordance with embodiments described herein.

After the CU failure of the CU in the primary data center 1304 is detected via link 1310, a light flavor of CU will be re-instantiated in a Node Group 1402 of another Data-Center, such as backup data center 1302. The Node Group 1402 is resized to allow new CUs to be added. In particular, the system may reduce the carrier to be configured on each cell under the CU. Optionally, new resources may be added in the existing Node Group 1402 to allow a new CU to be added. DUs are provisioned to communicate to both primary data center 1304 and backup data center 1302. During failover of the CU from the primary data center 1304, the transport network will switch over to the different local zone of the backup data center 1302.

Figure 16:
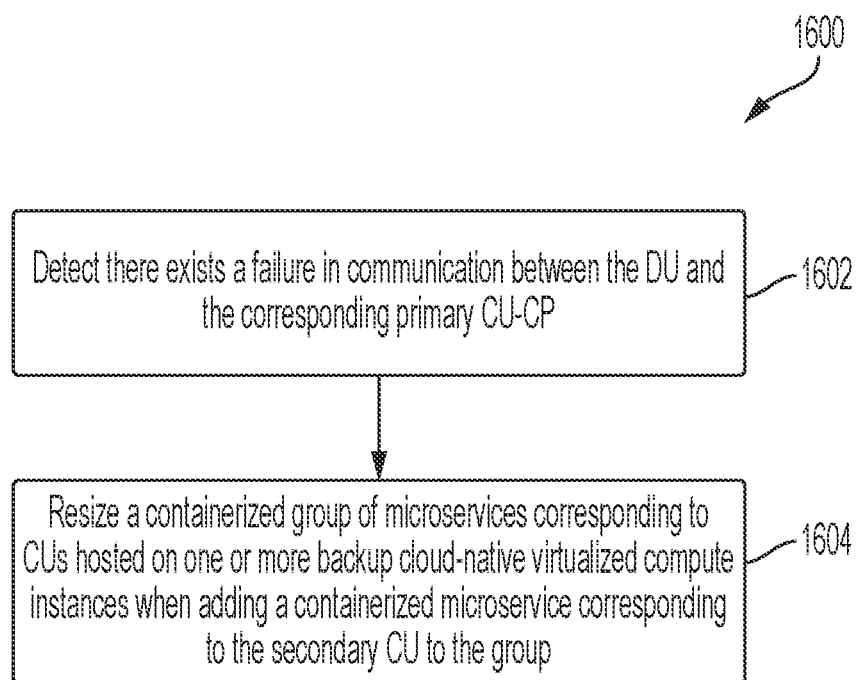
FIG. 16 illustrates a logical flow diagram showing one embodiment of a process for resizing a containerized group of microservices corresponding to CUs that will be resized to allow new CUs to be added for managing user experiences during a cellular telecommunication network outage in accordance with embodiments described herein.

FIG. 16 illustrates a logical flow diagram showing one embodiment of a process 1600 for resizing a containerized group of microservices corresponding to CUs that will be resized to allow new CUs to be added for managing user experiences during a cellular telecommunication network outage in accordance with embodiments described herein.

At 1602, the DU detects there exists a failure in communication between the DU and the corresponding primary CU-CP.

At 1604, in response to the DU detecting there exists a failure in communication between the DU and the corresponding primary CU-CP, the system resizes a containerized group of microservices corresponding to CUs hosted on one or more backup cloud-native virtualized compute instances in the backup physical data center when adding a containerized microservice corresponding to the secondary CU to the group. For example, this resizing may include reducing carrier bandwidth provided by the secondary CU as compared to the primary CU. As another example, the resizing may include adding new computing resources, including an additional cloud-native virtualized compute instance, to the containerized group of microservices to allow the containerized microservice corresponding to the secondary CU to be added to the group.

Figure 17:
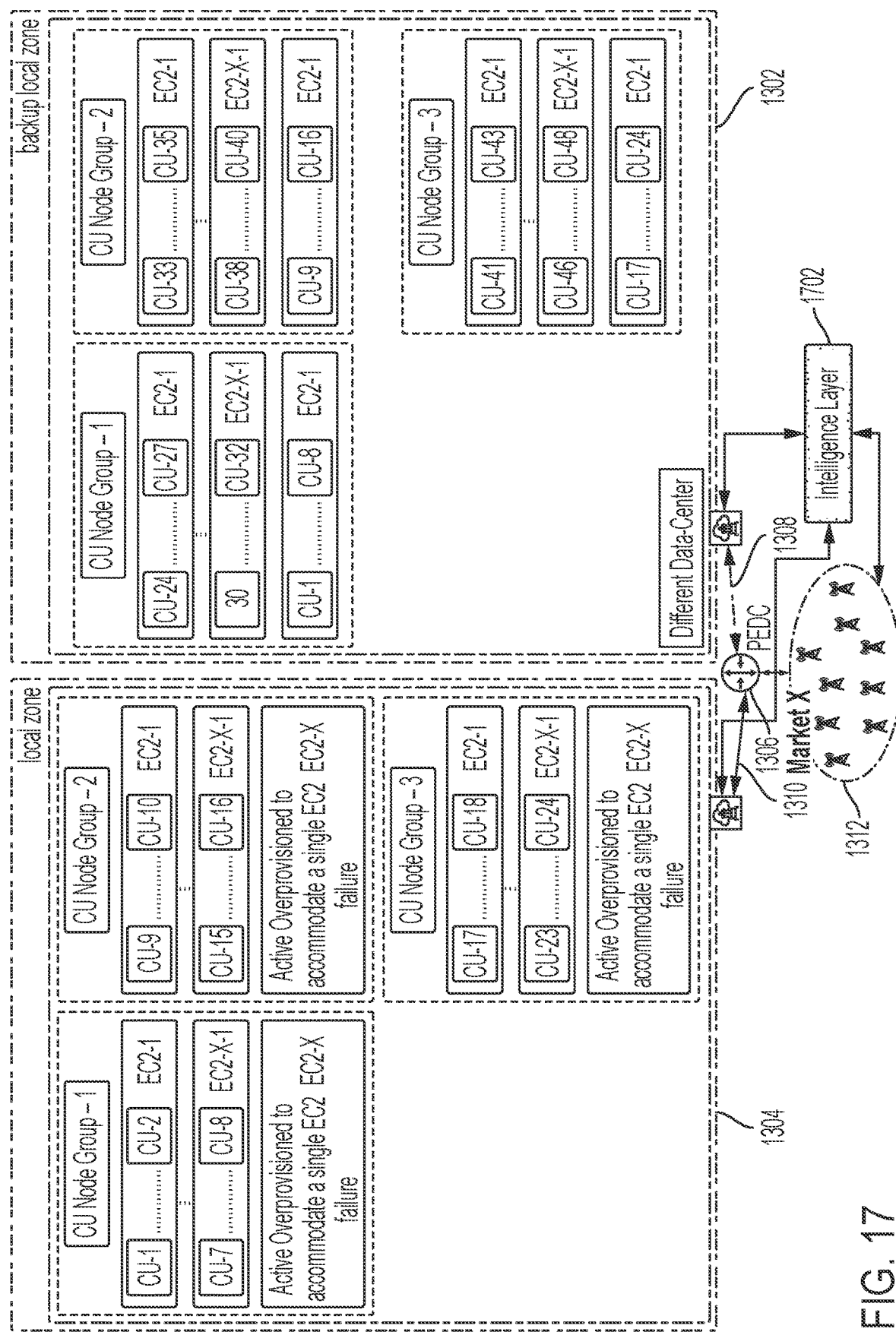
FIG. 17 illustrates a diagram showing an intelligence layer module external to a distributed unit (DU) and in communication with the DU, a primary physical data center and a backup physical data center for managing user experiences during a cellular telecommunication network outage in accordance with embodiments described herein.

FIG. 17 illustrates a diagram showing an intelligence layer module 1702 external to a DU of a cell site in market X 1312, and in communication with the DU, a primary physical data center 1304 and a backup physical data center 1302, for managing user experiences during a cellular telecommunication network outage in accordance with embodiments described herein.

The intelligence layer module 1702 is aware of the CU states of the CU hosted by the primary physical data center 1304 and the services offered. After the CU failure is detected, the intelligence layer module 1702 is responsible for orchestrating a new CU on a different Data-Center, such as backup physical data center 1302.

In response to the failure being detected, a light flavor of all CUs (reduced operating cells) will be re-instantiated by the intelligence layer module 1702 in Node Group 1402 of another Data-Center, such as backup data center 1302. Optionally, CUs providing high priority 5G network slices/services will be re-instantiated in Node Group 1402. Optionally, a light flavor of all CUs will serve all high priority services/slices and will service minimal low priority services.

In an example embodiment, the intelligence layer module 1702 will resize Node Group 1402 to allow new CUs to be added. For example, the intelligence layer module 1702 may reduce the carrier to be configured on each cell under the CU or the intelligence layer module 1702 may add new resources in the Node Group 1402 to allow a new CU to be added. The intelligence layer module 1702 may provision the DUs to communicate with both primary data center 1304 and backup data center 1302. During failover of the CU from the primary data center 1304, the intelligence layer module 1702 may cause the transport network to switch over to the different local zone of the backup data center 1302.

Figure 18:
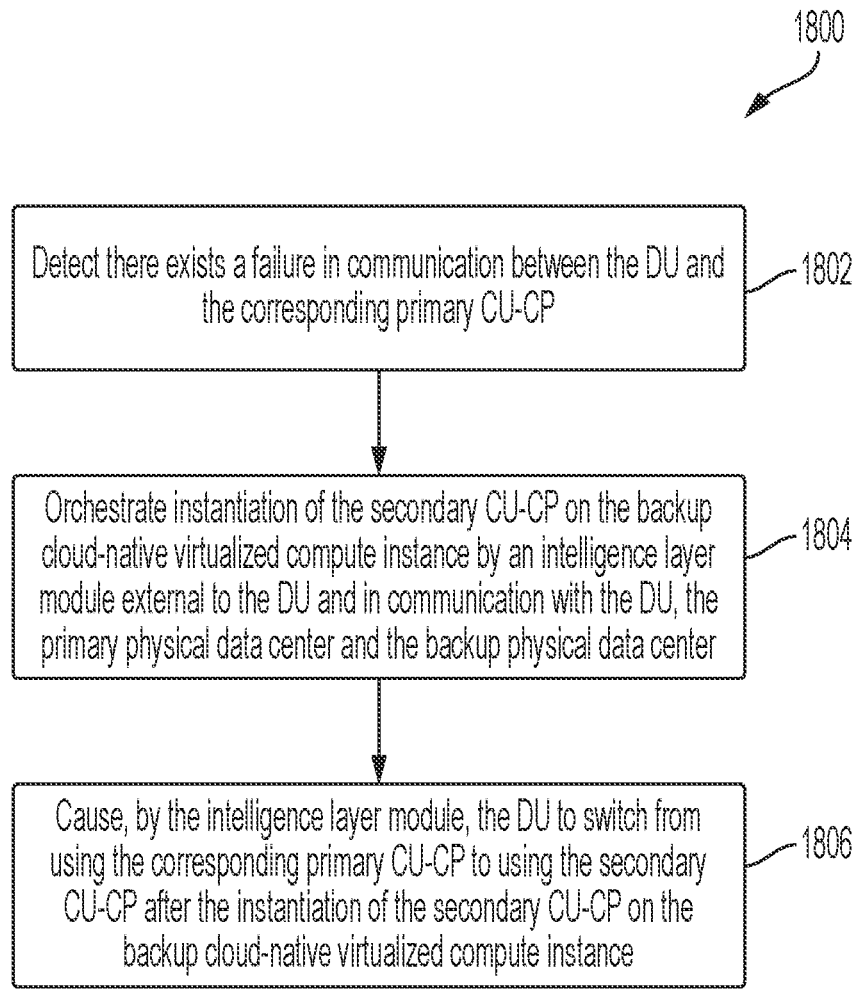
FIG. 18 illustrates a logical flow diagram showing one embodiment of a process utilizing the intelligence layer module of FIG. 17 for managing user experiences during a cellular telecommunication network outage in accordance with embodiments described herein.

FIG. 18 illustrates a logical flow diagram showing one embodiment of a process 1800 utilizing the intelligence layer module of FIG. 17 for managing user experiences during a cellular telecommunication network outage in accordance with embodiments described herein.

At 1802, the DU detects there exists a failure in communication between the DU and the corresponding primary CU-CP.

At 1804, in response to the DU detecting there exists a failure in communication between the DU and the corresponding primary CU-CP, an intelligence layer module external to the DU and in communication with the DU, the primary physical data center and the backup physical data center, orchestrates instantiation of the secondary CU-CP on the backup cloud-native virtualized compute instance. In an example embodiment, the secondary CU-CP on the backup cloud-native virtualized compute instance provides more limited bandwidth capabilities to the DU as compared to the primary CU-CP.

At 1806, the intelligence layer module causes, utilizing the secondary ID, the DU to switch from using the corresponding primary CU-CP to using the secondary CU-CP after the instantiation of the secondary CU-CP on the backup cloud-native virtualized compute instance. The intelligence layer may immediately initiate, utilizing the secondary ID, redirection of high priority UEs connected to the DU or high priority services associated with the DU to use services associated with the secondary CU-CP.

In an example embodiment, after initiating redirection of all high priority UEs connected to the DU or all high priority services associated with the DU, the intelligence layer may select certain lower priority UEs connected to the DU or certain lower priority services associated with the DU. The intelligence layer then initiates, utilizing the secondary ID, redirection of the selected certain lower priority UEs connected to the DU or the selected certain lower priority services to use services associated with the secondary CU-CP.

The intelligence layer module may initiate redirection of one or more UEs connected to the DU, or one or more services associated with the DU, to use services associated with the secondary CU-CP based on predictions made by the intelligence layer regarding future communication failures between the DU and the CU-CP. For example, the intelligence layer module may select one or more UEs connected to the DU, or services associated with the DU, for which to initiate redirection to use services associated with the secondary CU-CP based on predictions made by the intelligence layer regarding future communication failures between the DU and the CU-CP. Then the intelligence layer module will initiate redirection of the selected UEs connected to the DU, or the selected services associated with the DU, to use services associated with the secondary CU-CP. The intelligence layer module may initiate redirection of one or more non-selected UEs connected to the DU, or one or more non-selected services associated with the DU, to use services of a wireless carrier roaming partner of the particular mobile network operator or another cellular telecommunications service carrier of the particular mobile network operator serviced by another cellular site base station.

Figure 19:
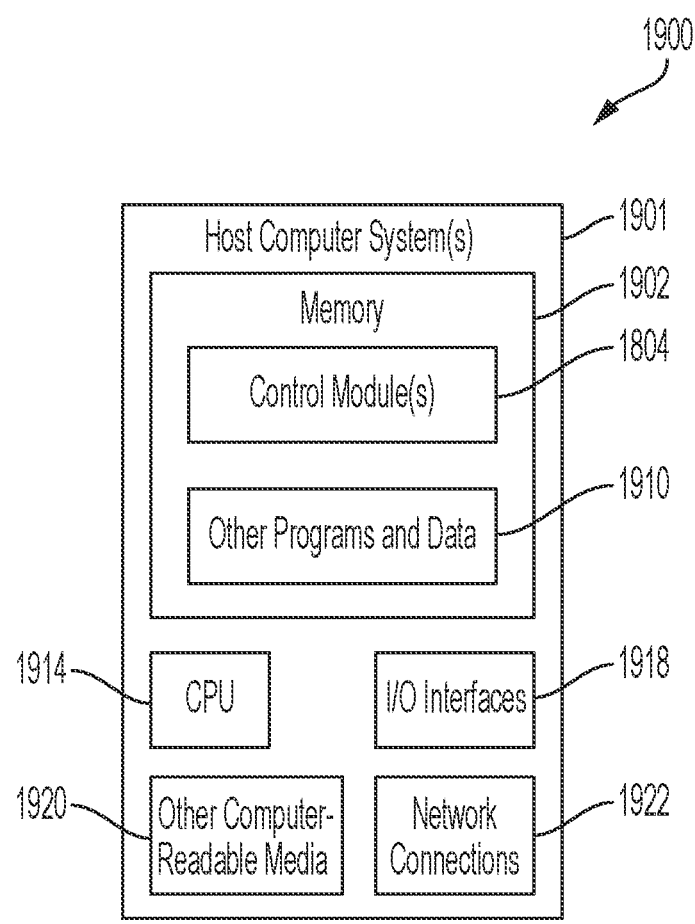
FIG. 19 shows a system diagram that describes an example implementation of a computing system(s) for implementing embodiments described herein.

FIG. 19 shows a system diagram that describes an example implementation of a computing system(s) for implementing embodiments described herein.

The functionality described herein for managing user experiences during cellular telecommunication network outages, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 6 illustrates an example of underlying hardware on which such software and functionality may be hosted and/or implemented.

In particular, shown is example host computer system(s) 1901. For example, such host computer system(s) 1901 may represent those in various data centers and cell sites shown and/or described herein that host the functions, components, microservices and other aspects described herein to implement managing user experiences during cellular telecommunication network outages. In some embodiments, one or more special-purpose computing systems may be used to implement the functionality described herein. Accordingly, various embodiments described herein may be implemented in software, hardware, firmware, or in some combination thereof. Host computer system(s) 1901 may include memory 1902, one or more central processing units (CPUs) 1914, I/O interfaces 1918, other computer-readable media 1920, and network connections 1922.

Memory 1902 may include one or more various types of non-volatile and/or volatile storage technologies. Examples of memory 1902 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 1902 may be utilized to store information, including computer-readable instructions that are utilized by CPU 1914 to perform actions, including those of embodiments described herein.

Memory 1902 may have stored thereon control module(s) 1904. The control module(s) 1904 may be configured to implement and/or perform some or all of the functions of the systems, components and modules described herein for managing user experiences during cellular telecommunication network outages. Memory 1902 may also store other programs and data 1910, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 1922 are configured to communicate with other computing devices to facilitate the functionality described herein. In various embodiments, the network connections 1922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1918 may include a video interfaces, other data input or output interfaces, or the like. Other computer-readable media 1920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for managing user experiences during a cellular telecommunication network outage involving network communication failure detection, the method comprising:

a distributed unit (DU) of a fifth-generation New Radio (5G NR) cellular telecommunication network detecting there exists a failure in communication between the DU and a corresponding central unit control plane (CU-CP) of a 5G NR centralized unit (CU); and performing different recovery actions in response to the failure in communication being due to a detected inactive network link to the CU-CP versus the CU-CP itself being initially indicated as inactive;

wherein the performing different recovery actions in response to the failure in communication being due to the detected inactive network link to the CU-CP versus the CU-CP itself being initially indicated as inactive includes:

the DU sending a CU-CP heartbeat request to an Internet Protocol (IP) address of the CU-CP at a pre-configured interval;

the DU re-trying for a preconfigured amount of time to send the CU-CP heartbeat request to the IP address of the CU-CP in response to not receiving a response to the CU-CP heartbeat request; and in response to not receiving a response to the re-trying for the preconfigured amount of time to send the CU-CP heartbeat request to the IP address of the CU-CP, the DU sending a CU-CP default gateway heartbeat request to a default Gateway IP address of the CU-CP at a pre-configured interval.

2. The method of claim 1, further comprising:

re-trying for a preconfigured amount of time to send the CU-CP default gateway heartbeat request to the default Gateway IP address of the CU-CP in response to not receiving a response to the CU-CP default gateway heartbeat request;

determining there is an inactive network link to the CU-CP based on not receiving a response to the re-trying for the preconfigured amount of times to send the CU-CP default gateway heartbeat request to the default Gateway IP address of the CU-CP; and in response to the determination that there is an inactive network link to the CU-CP, the DU immediately sending a radio resource control (RRC) connection release message to user equipment devices (UEs) connected to the DU.

3. The method of claim 1, further comprising:

receiving a response to the CU-CP default gateway heartbeat request to the default Gateway IP address of the CU-CP;

determining that there is not an inactive network link to the CU-CP based on receiving a response to the CU-CP default gateway heartbeat request to the default Gateway IP address of the CU-CP; and in response to determining that there is not an inactive network link to the CU-CP, the DU re-trying again for a second preconfigured amount of time to send the CU-CP heartbeat request to the IP address of the CU-CP.

4. The method of claim 3, further comprising:

in response to not receiving a response to the re-trying again for the second preconfigured amount of time to send the CU-CP heartbeat request to the IP address of the CU-CP, the DU sending an RRC connection release message to UEs connected to the DU.

5. The method of claim 1, further comprising:

re-trying for a preconfigured amount of time to send the CU-CP default gateway heartbeat request to the default Gateway IP address of the CU-CP in response to not receiving a response to the CU-CP default gateway heartbeat request;

determining that there is not an inactive network link to the CU-CP based on receiving a response to the re-trying for the preconfigured amount of times to send the CU-CP default gateway heartbeat request to a default Gateway IP address of the CU-CP; and in response to determining that there is not an inactive network link to the CU-CP, the DU re-trying again for a second preconfigured amount of time to send the CU-CP heartbeat request to the IP address of the CU-CP.

6. The method of claim 5, further comprising:

in response to not receiving a response to the re-trying again for the second preconfigured amount of time to send the CU-CP heartbeat request to the IP address of the CU-CP, the DU sending an RRC connection release message to UEs connected to the DU.

7. A system for managing user experiences during a cellular telecommunication network outage involving network communication failure detection, the system comprising:

at least one memory that stores computer executable instructions; and at least one processor that executes the computer executable instructions to cause actions to be performed, the actions including:

a distributed unit (DU) of a fifth-generation New Radio (5G NR) cellular telecommunication network detecting there exists a failure in communication between the DU and a corresponding central unit control plane (CU-CP) of a 5G NR centralized unit (CU); and performing different recovery actions in response to the failure in communication being due to a detected inactive network link to the CU-CP versus the CU-CP itself being initially indicated as inactive;

wherein the performing different recovery actions in response to the failure in communication being due to the detected inactive network link to the CU-CP versus the CU-CP itself being initially indicated as inactive includes:

the DU sending a CU-CP heartbeat request to an Internet Protocol (IP) address of the CU-CP at a pre-configured interval;

the DU re-trying for a preconfigured amount of time to send the CU-CP heartbeat request to the IP address of the CU-CP in response to not receiving a response to the CU-CP heartbeat request; and in response to not receiving a response to the re-trying for the preconfigured amount of time to send the CU-CP heartbeat request to the IP address of the CU-CP, the DU sending a CU-CP default gateway heartbeat request to a default Gateway IP address of the CU-CP at a pre-configured interval.

8. The system of claim 7 wherein the at least one processor executes the computer executable instructions to cause further actions to be performed including:

re-trying for a preconfigured amount of time to send the CU-CP default gateway heartbeat request to the default Gateway IP address of the CU-CP in response to not receiving a response to the CU-CP default gateway heartbeat request;

determining that there is an inactive network link to the CU-CP based on not receiving a response to the re-trying for the preconfigured amount of times to send the CU-CP default gateway heartbeat request to a default Gateway IP address of the CU-CP; and in response to the determination there is an inactive network link to the CU-CP, the DU immediately sending a radio resource control (RRC) connection release message to user equipment devices (UEs) connected to the DU.

9. The system of claim 7 wherein the at least one processor executes the computer executable instructions to cause further actions to be performed including:

receiving a response to the CU-CP default gateway heartbeat request to the default Gateway IP address of the CU-CP;

determining that there is not an inactive network link to the CU-CP based on receiving a response to the CU-CP default gateway heartbeat request to the default Gateway IP address of the CU-CP; and in response to determining there is not an inactive network link to the CU-CP, the DU re-trying again for a second preconfigured amount of time to send the CU-CP heartbeat request to the IP address of the CU-CP.

10. The system of claim 9, wherein the at least one processor executes the computer executable instructions to cause further actions to be performed including:
in response to not receiving a response to the re-trying again for the second preconfigured amount of time to send the CU-CP heartbeat request to the IP address of the CU-CP, the DU sending an RRC connection release message to UEs connected to the DU.

11. The system of claim 7, wherein the at least one processor executes the computer executable instructions to cause further actions to be performed including:
re-trying a preconfigured amount of time to send the CU-CP default gateway heartbeat request to the default Gateway IP address of the CU-CP in response to not receiving a response to the CU-CP default gateway heartbeat request;
determining that there is not an inactive network link to the CU-CP based on receiving a response to the re-trying for the preconfigured amount of times to send the CU-CP default gateway heartbeat request to the default Gateway IP address of the CU-CP; and
in response to determining there is not an inactive network link to the CU-CP, the DU re-trying again for a second preconfigured amount of time to send the CU-CP heartbeat request to the IP address of the CU-CP.

12. The system of claim 11 wherein the at least one processor executes the computer executable instructions to cause further actions to be performed including:
in response to not receiving a response to the re-trying again for the second preconfigured amount of time to send the CU-CP heartbeat request to the IP address of the CU-CP, the DU sending an RRC connection release message to UEs connected to the DU.

13. A non-transitory computer-readable storage medium having computer-executable instructions stored thereon that, when executed by at least one processor, cause the at least one processor to cause actions to be performed, the actions including:
a distributed unit (DU) of a fifth-generation New Radio (5G NR) cellular telecommunication network detecting there exists a failure in communication between the DU and a corresponding central unit control plane (CU-CP) of a 5G NR centralized unit (CU); and
performing different recovery actions in response to the failure in communication being due to a detected inactive network link to the CU-CP versus the CU-CP itself being initially indicated as inactive;
wherein the performing different recovery actions in response to the failure in communication being due to the detected inactive network link to the CU-CP versus the CU-CP itself being initially indicated as inactive includes:
the DU sending a CU-CP heartbeat request to an Internet Protocol (IP) address of the CU-CP at a pre-configured interval;
the DU re-trying for a preconfigured amount of time to send the CU-CP heartbeat request to the IP address of the CU-CP in response to not receiving a response to the CU-CP heartbeat request; and
in response to not receiving a response to the re-trying for the preconfigured amount of time to send the CU-CP heartbeat request to the IP address of the CU-CP, the DU sending a CU-CP default gateway heartbeat request to a default Gateway IP address of the CU-CP at a pre-configured interval.

14. The non-transitory computer-readable storage medium of claim 13 wherein the computer-executable instructions stored thereon, when executed by at least one processor, further cause the at least one processor to cause actions to be performed including:
re-trying for a preconfigured amount of time to send the CU-CP default gateway heartbeat request to the default Gateway IP address of the CU-CP in response to not receiving a response to the CU-CP default gateway heartbeat request;
determining that there is an inactive network link to the CU-CP based on not receiving a response to the re-trying for the preconfigured amount of times to send the CU-CP default gateway heartbeat request to a default Gateway IP address of the CU-CP; and
in response to the determination that there is an inactive network link to the CU-CP, the DU immediately sending a radio resource control (RRC) connection release message to user equipment devices (UEs) connected to the DU.

15. The non-transitory computer-readable storage medium of claim 13 wherein the computer-executable instructions stored thereon, when executed by at least one processor, further cause the at least one processor to cause actions to be performed including:
receiving a response to the CU-CP default gateway heartbeat request to the default Gateway IP address of the CU-CP;
determining that there is not an inactive network link to the CU-CP based on receiving a response to the CU-CP default gateway heartbeat request to the default Gateway IP address of the CU-CP; and
in response to determining that there is not an inactive network link to the CU-CP, the DU re-trying again for a second preconfigured amount of time to send the CU-CP heartbeat request to the IP address of the CU-CP.

16. The non-transitory computer-readable storage medium of claim 15, wherein the computer-executable instructions stored thereon, when executed by at least one processor, further cause the at least one processor to cause actions to be performed including:
in response to not receiving a response to the re-trying again for the second preconfigured amount of time to send the CU-CP heartbeat request to the IP address of the CU-CP, the DU sending an RRC connection release message to UEs connected to the DU.

17. The non-transitory computer-readable storage medium of claim 13, wherein the computer-executable instructions stored thereon, when executed by at least one processor, further cause the at least one processor to cause actions to be performed including:
re-trying a preconfigured amount of time to send the CU-CP default gateway heartbeat request to the default Gateway IP address of the CU-CP in response to not receiving a response to the CU-CP default gateway heartbeat request;
determining that there is not an inactive network link to the CU-CP based on receiving a response to the re-trying for the preconfigured amount of times to send the CU-CP default gateway heartbeat request to a default Gateway IP address of the CU-CP; and
in response to determining that there is not an inactive network link to the CU-CP, the DU re-trying again for a second preconfigured amount of time to send the CU-CP heartbeat request to the IP address of the CU-CP.

\* \* \* \* \*